(No Model.)
A. J. CLELAND.
AUTOMATIC CAR COUPLING.
No. 471,952. Patented Mar. 29, 1892.
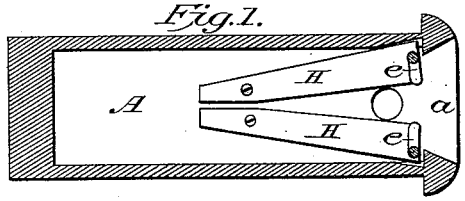
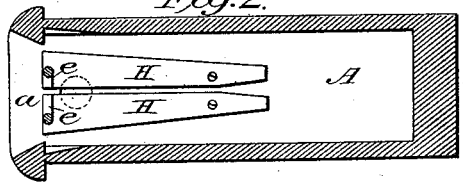
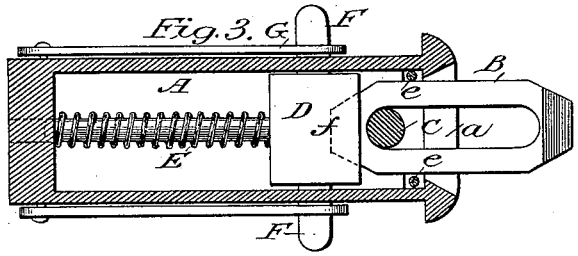
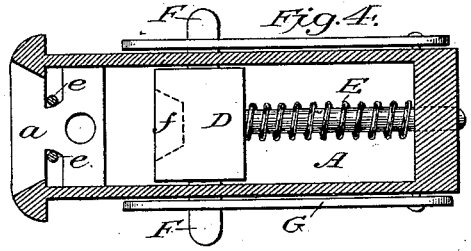
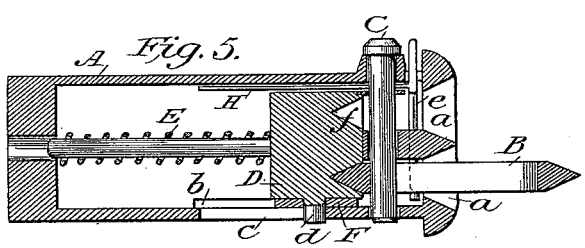
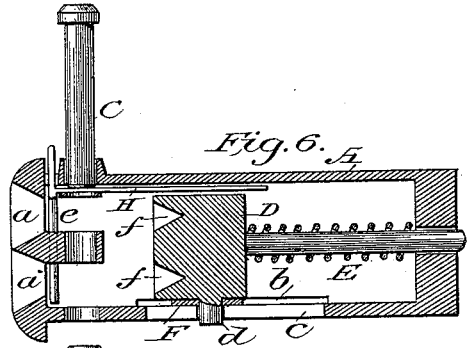
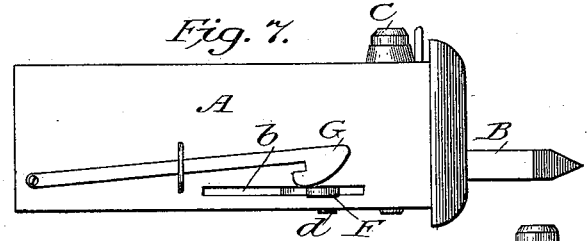
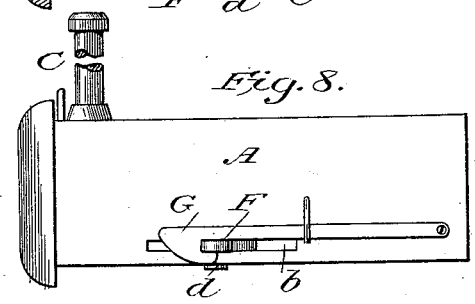
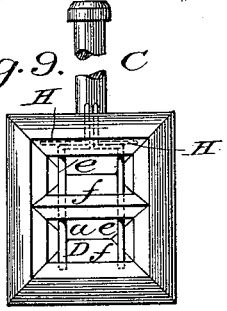
Witnesses.
Inventor.
Andrew J. Cleland

UNITED STATES PATENT OFFICE.

ANDREW J. CLELAND, OF MANKATO, MINNESOTA.

AUTOMATIC CAR-COUPLING.

SPECIFICATION forming part of Letters Patent No. 471,952, dated March 29, 1892.

Application filed May 21, 1891. Serial No. 393,651. (No model.)

*To all whom it may concern:*

Be it known that I, ANDREW J. CLELAND, of the city of Mankato, county of Blue Earth, and State of Minnesota, have invented a new and useful Improvement for Automatically Holding the Link and Pin in Freight-Car Couplings, of which the following is a specification.

My invention relates to the method of coupling freight-cars with the link and pin; and the objects of my improvement are to hold the link firmly in one draw-head while it enters the draw-head to which it is to be coupled, and also to hold the pin in readiness to drop to its place in the draw-head to which the coupling is to be made. I attain these objects by the mechanism illustrated in the accompanying drawings, in which—

Figure 1 is a horizontal sectional view of the under side of top plate of draw-head, showing slides H H displaced, allowing pin C to drop to its position, as represented in Fig. 5. Fig. 2 is also a horizontal sectional view showing slides closed for the purpose of holding pin in readiness to drop to its position through link B when it enters draw-head, as illustrated in Fig. 6. Fig. 3 is a horizontal central view of one of the draw-heads, showing lever F unlatched, allowing clutch D to press against link B when making the coupling. Fig. 4 is also a horizontal central view showing latches G G thrown over lever, thereby holding clutch D out of the way when link enters. Fig. 5 is a longitudinal section through the center of draw-heads, showing pin and link in their respective positions, with clutch D pressing against link B in readiness to make a coupling. Fig. 6 is also a longitudinal section through the center of draw-head, showing pin resting on slides H H in readiness to drop to its position when the link enters, and also showing clutch thrown back, so that it will not interfere with the link in entering the draw-head. Fig. 7 is a side elevation of draw-head, showing link B and pin C in their respective positions, and also showing latch G thrown off of lever F, thereby allowing clutch D to press against the link when making coupling. Fig. 8 is also a side elevation of draw-head with pin resting on slides H H in readiness to drop into position when link enters draw-head, and also showing latch G thrown over lever F, thereby holding clutch D away from contact with link when it enters. Fig. 9 is a perspective view showing apertures of draw-head slides H H closed to support pin C. Pendent rods E E, which are attached to slides, are thereby forced in across the face of the apertures. When link enters, the pendent rods are forced by the link to the sides of the draw-head. The slides are thereby removed from under the pin, and it drops to its position through the link.

A A are the draw-heads; B, the link; C C, the pins; D, the clutch; E, the spring; F, the pivoted lever; G G, the latches, and H H the slides. Draw-heads A A have two apertures *a a* for link B to enter, one above the other, to compensate for different height of cars. It also has slots *b b* on each side, through which the ends of the pivoted lever F pass, and also slot *c* in the bottom plates of draw-heads, in which the plug attached to clutch D slides. Link B has wedge-shaped ends for entering apertures of draw-heads and displacing pendent rods *e e*, attached to slides H H, and also conforming to cavities *f* in clutch D. Clutch D is a metal block fitting loosely in inside of draw-heads A A, having cavities *f*, the outer surfaces of which conform to the inner surfaces of apertures *a a* in draw-heads with same number of cavities in clutch D as there are apertures in draw-heads. The cavities also conform to the wedge-shaped ends of link B for the purpose of holding link firmly when set for coupling. At opposite end of clutch is attached spring E for the purpose of throwing clutch D forward, engaging link B and pressing it firmly against pin C in making coupling. At the bottom of clutch D is plug *d*, upon which pivoted lever F swings. Spring E is attached to back end of clutch D and is of sufficient capacity of contraction and expansion to allow link B to be forced back into draw-head in case it meets with an obstruction in coupling and of sufficient power to hold the link B firmly against pin C. Pivoted lever F is hung loosely on plug *d* in clutch D and is for the purpose of holding clutch D away from link B after coupling is made, both ends of pivoted lever F passing out through slots *b b* in draw-head. Latches G G are attached to side of draw-head above slots *b b* in such a manner that when latched over the ends of pivoted lever F they hold clutch D away from link B after coupling has been made. Slides H H are two metal plates placed on the under side of upper plate or section of draw-heads in such manner as that when closed together they cover the under part of the hole through which the pin is to pass when making the coupling. These slides have pendent rods *e e* attached, hanging down through draw-heads and so placed in the slides H H that when the slides are closed together the pendent rods *e e* close up so much of the apertures *a a* in draw-heads as the slides close up under the hole through which the pin C is to pass when making the coupling.

In making a coupling one end of link B is inserted in aperture of draw-head and pin C inserted through it in position. One end of pivoted lever F is disengaged from the latch G. Clutch D instantly flies forward and engages the link B, pressing it firmly against pin C. The slides H H are pressed together in the draw-head to which the coupling is to be made and the pin placed in position on the slides. When the link enters the draw-head, the slides are pressed apart by the displacement of pendent rods *e e*, the pin passes to its place in draw-head, and the coupling is made. The pivoted lever F is again thrown back and held by latch G.

I am aware that the draw-heads A A, the link B, and pin C are old devices and have been used in combination in coupling freight-cars prior to my invention.

What I do claim as my invention, and desire to secure by Letters Patent, is—

1. The slots *b b* and *c* in draw-head, in combination with clutch D, pivoted lever F, spring E, and latches G G, all substantially as set forth.

2. Slides H H, having pendent rods *e e* attached, substantially as shown, for the purpose specified.

ANDREW J. CLELAND.

Witnesses
  H. W. CLELAND,
  P. B. SPARROW.